US007143415B2

(12) United States Patent
Connelly et al.

(10) Patent No.: US 7,143,415 B2
(45) Date of Patent: Nov. 28, 2006

(54) METHOD FOR USING SELF-HELP TECHNOLOGY TO DELIVER REMOTE ENTERPRISE SUPPORT

(75) Inventors: Jon Christopher Connelly, Windsor, CO (US); Adam Michael Carr, Fort Collins, CO (US); Kimberly C. Horn, Fort Collins, CO (US); Eric William Loy, Fort Collins, CO (US); Stewart W. Mayott, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 639 days.

(21) Appl. No.: 10/226,514

(22) Filed: Aug. 22, 2002

(65) Prior Publication Data

US 2004/0039805 A1 Feb. 26, 2004

(51) Int. Cl.
*G06F 9/46* (2006.01)
*G06F 11/00* (2006.01)

(52) U.S. Cl. ......................................... 719/310; 714/46

(58) Field of Classification Search ................ 719/310; 714/46

See application file for complete search history.

(56) References Cited

U.S. PATENT DOCUMENTS

| | | | | |
|---|---|---|---|---|
| 6,012,152 | A * | 1/2000 | Douik et al. ................... 714/26 |
| 6,029,258 | A * | 2/2000 | Ahmad ......................... 714/46 |
| 6,490,620 | B1 * | 12/2002 | Ditmer et al. ............... 709/224 |
| 6,859,893 | B1 * | 2/2005 | Hines ........................... 714/38 |
| 2003/0217064 | A1 * | 11/2003 | Walters ....................... 707/100 |

* cited by examiner

*Primary Examiner*—William Thomson
*Assistant Examiner*—Lechi Truong

(57) ABSTRACT

In a service-based remote support delivery system and method, service engineers supported by an analysis server receive incident reports from both personal computers and from unmanned servers within an enterprise. The incidents arise both from user-created reports of problems, from event annunciators that monitor hardware and software to report events as they occur, and from the periodic gathering of configuration data. These incident reports are combined with host information and contact information and are transmitted to the analysis server.

9 Claims, 3 Drawing Sheets

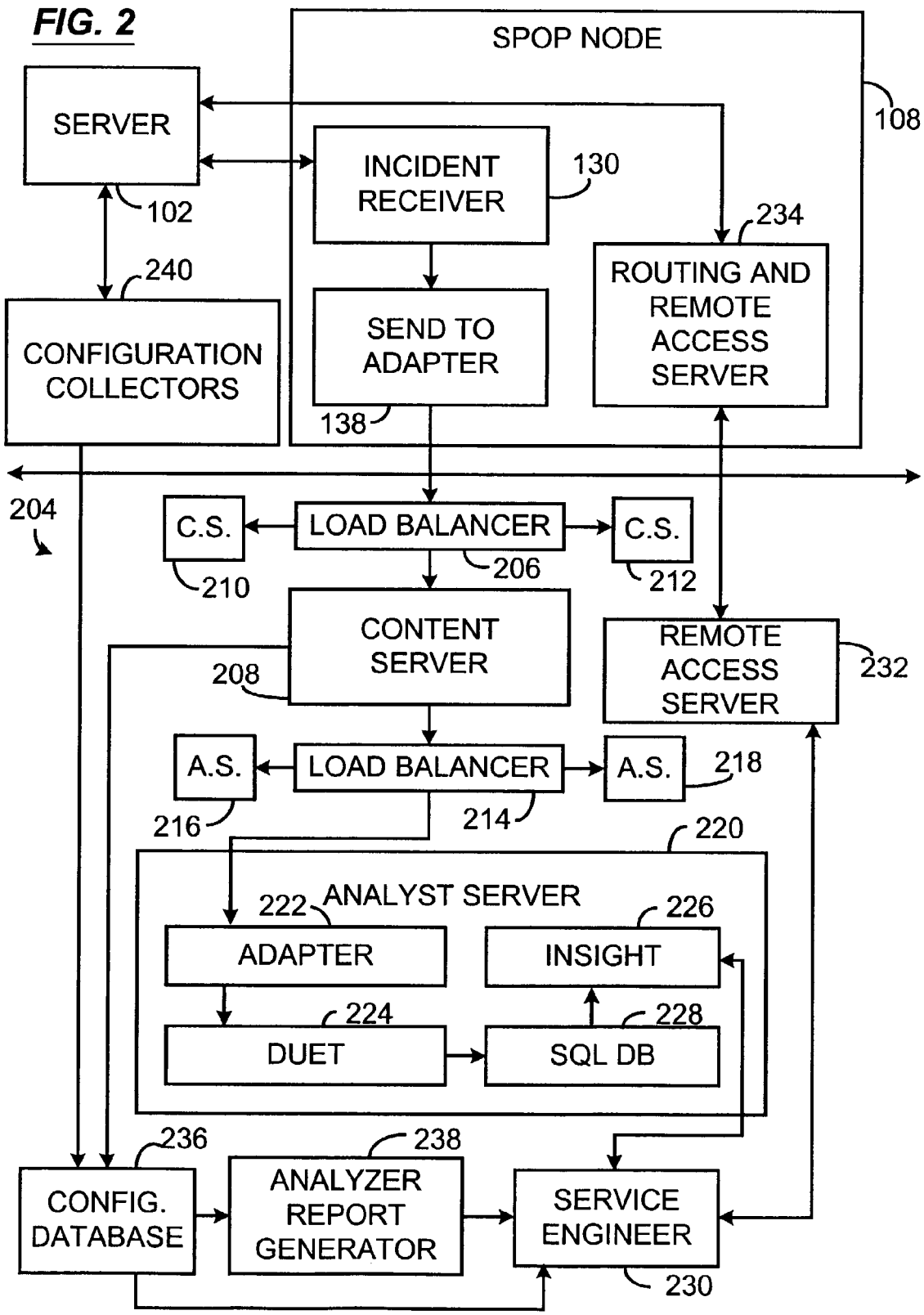

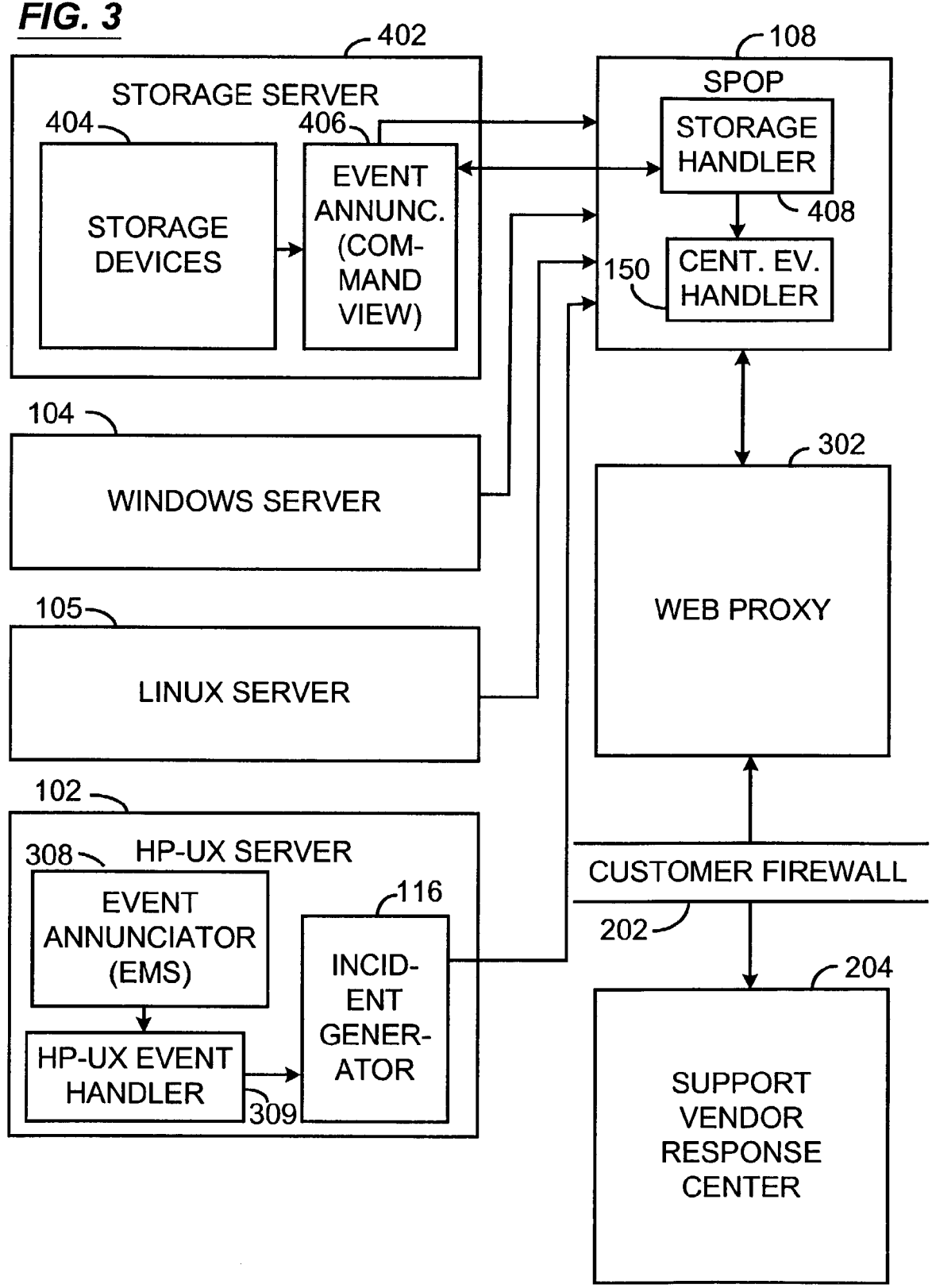

METHOD FOR USING SELF-HELP TECHNOLOGY TO DELIVER REMOTE ENTERPRISE SUPPORT

CROSS-REFERENCE TO RELATED PATENT APPLICATIONS

This application hereby incorporates by reference for all purposes the specifications and drawings of application Ser. No. 09/851,963 filed on May 10, 2001, Van Giel et al., application Ser. No. 10/135,398 filed on May 1, 2002, Soto et al., and "A Method and Framework for Service-Based Remote Support Delivery," Adam Michael Carr et al., filed Aug. 21, 2002, all three of which have the same assignee as the present application.

BACKGROUND OF THE INVENTION

1. Field of the Invention

The present invention relates generally to providing maintenance and support of both hardware and software on computers. In particular, it relates to the automatic detection of problems and issues on computers within an enterprise and the provision of maintenance and repair services from a remote central site.

2. Description of the Related Art

As a number of personal computers and servers used throughout business enterprises has increased, and as the price of the hardware and software has decreased, the cost of setting up and maintaining a large array of networked computers has come to be dominated by cost of servicing the computers and keeping them all operating. In the past, this was done by manual intervention, with service personnel visiting each computer or with the computers being brought in for repair. But the cost of providing such manual service is high, and the difficulties of providing trained staff members able to cope with any problem that might arise on any given computer has also grown. Additionally, the time it takes for service personnel to visit a site greatly increases the time during which a given computer may be out of service due to some problem.

Accordingly, attempts have been made in the past to automate some or all of the tasks relating to computer maintenance and repair. With respect to personal computers, a first approach has been to make available to the user, on the computer itself and also within service sites maintained on the Internet, knowledge data bases containing detailed documentary descriptions of the programs, and also self-help tools. Thus, for example, one may learn from a centralized database that new software drivers for hardware accessories are available, and these may be downloaded and automatically installed on personal computers. Likewise, software patch analyzers are available which can trace a problem to software defects and which can suggest the downloading of more recent versions of the software that may cure those problems.

An even more sophisticated approach to PC maintenance is provided by the ServiceNet platform developed by Motive Communications, Incorporated. ServiceNet is designed around a self-help paradigm in which a person using a desktop computer notices a problem and then manually opens a "trouble ticket" that is transmitted to a support provider. The PC operator uses a web interface to report the problem to a program called Chorus Client, which is an incident escalator. The incident escalator first may try to run prewritten diagnostic scripts or provide "self-help" tools. It may then "isolate" the incident, running scripts to gather configuration data, and then combining the user's problem description and the configuration data with contact information identifying the user of the computer and including such things as name, e-mail address, and telephone number. It may also gather host information from the PC. These are transmitted to an incident receiver which parses the information and passes it on to a central analysis server where a program called Duet, in combination with a program called Insight, enable the provision of "online" assistance by a service engineer to review the problem in the context of the user's computer as configured and to provide assistance.

In general, self-support tools such as those described above do not offer automated monitoring nor automated problem detection capabilities. To the extent that such capabilities are available, automated problem detection and support currently focuses upon product-specific or market-specific functionality. For example, Hewlett Packard provides a product called predictive support that enables remote failure detection for the Hewlett Packard HP3000 and HP9000 business servers. This is a modem-based solution, where each client computer directly dials into a support center to give notification of a device failure. In the area of disk drives, Hitachi has a system called Hi-Track that provides remote event management and configuration management for the Hitachi 7700 and 7900 disc arrays. EMC provides similar functionality for its Symmetrix line of storage devices. Hewlett Packard's High Availability Observatory (HAO) provides remote event management for Hewlett Packard's line of SuperDome servers and also configuration management for their HP9000 servers, Windows 2000 servers, and some proprietary routers and switches. Hewlett Packard also has a product called Network Support Platform which provides configuration management, discovery, and remote connectivity for network interconnect devices that include Hewlett Packard, Sysco, and Nortel routers, switches, and hubs.

While these products are useful, they tend to focus on functionality that is more useful to the support provider than to the organization that owns the computers. They do not allow the local administrator of the computers to interact with the tools or to observe the data transmitted to the support provider. And they are also typically dependent upon the use of serial-line technologies, such as modems or ISDN telephone lines, which present limitations in terms of scalability and performance.

SUMMARY OF THE INVENTION

Briefly summarized, an embodiment of the present invention is a service-based remote support delivery system and method. Service engineers, supported by an analysis server receive incident reports from both personal computers and from unmanned servers within an enterprise. The incidents arise both from user-created reports of problems, from event annunciators that monitor hardware and software to report events as they occur, and from the periodic gathering of configuration data. These incident reports are combined with host information and contact information and are transmitted to the analysis server.

BRIEF DESCRIPTION OF THE DRAWINGS

FIG. 2 illustrates a central site analysis server that is designed to communicate with SPOP nodes and servers such as those shown in FIG. 1, in this first embodiment of the invention.

FIG. 3 illustrates a number of different types of servers interconnected to a central response center by an SPOP node, in accordance with the first embodiment of FIGS. 1 and 2.

DETAILED DESCRIPTION

Figure 1:
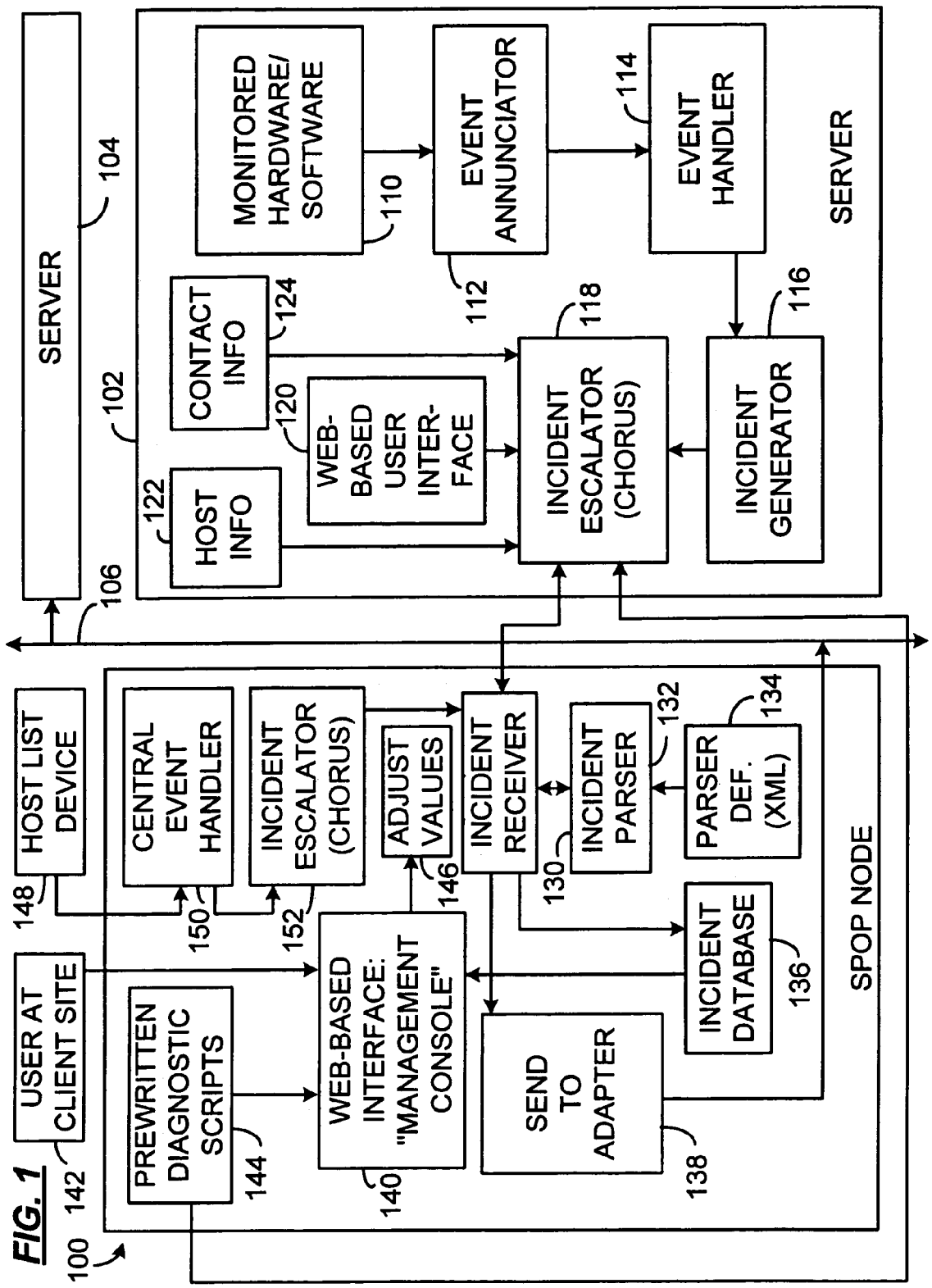
FIG. 1 illustrates a first embodiment of the invention that utilizes an SPOP node to monitor both reactive and proactive incidents originating from a number of servers at a remote site.

An embodiment of the present invention is primarily built on top of, and is designed to enhance and augment, a product called the ServiceNet Platform developed by Motive Communications, Incorporated.

With reference to FIG. 1, a server 102 is shown. Assuming for the moment, for the purpose of briefly describing ServiceNet, that this is a personal computer (rather than a server), the ServiceNet system works conventionally (in its unmodified state) in the following manner. When the user of this personal computer detects a problem, the user clicks on a "service" icon (on the user's desktop or within an application, for example) that causes a web browser to bring up a web-based user interface 120 which provides the user with a form into which the user may enter a description of the problem. This information is then passed to a program called Motive Chorus, a client program that resides upon the personal computer and that serves as an interactive assistance tool, capable of running diagnostic scripts, and also as an incident escalator 118. In addition, the personal computer contains host information 122 and also contact information 124 defining the name, phone number, e-mail address of the operator of this particular computer to make it possible for service personnel to contact that individual. The escalator 118 may also run scripts 144 to gather configuration data. The incident escalator 118 combines this configuration data, host information, and contact information with the user-supplier information defining the incident, and then all of this information is passed on to an incident receiver 130 which records the incident in a database 136. Then programs called Motive Insight and Motive Duet enable a service engineer to study the problem and to come up with possible solutions. A management console program permits management of server configuration information.

The embodiment of the present invention shown in FIGS. 1, 2, and 4 utilizes all of these elements of the ServiceNet Platform, but redesigns them, enhances them, and augments them to provide additional and expanded services that greatly enhance the types of support that may be provided. In particular, proactive, or anticipatory data gathering actions and reactive, or event-triggered data gathering activities, are added to ServiceNet's user-reactive ability to log and to track events in a uniform manner, over many different hardware and software entities, as is explained below.

Referring now to FIG. 1, two typical, unattended servers 102 and 104 are shown and are presumed to be in an enterprise environment, interconnected by a network 106 to other enterprise devices. As can be seen, these servers are each equipped with an incident escalator 118, a web-based user interface 120, host information 122, and contact information 124. But since these servers typically run unattended, it is not normally possible to manually institute the creation of an incident record using the web-based user interface 120, as with a personal computer having a human operator. Instead, automatic event detectors are relied upon to detect significant events.

The server 102 contains both hardware and software that is monitored at 110. Associated with the monitored hardware and software 110 are one or more event annunciators 112. These event annunciators 112 may take widely differing forms depending upon the nature of the hardware or software that is monitored. For example, in some hardware, the event annunciators may be triggered into operation by an event occurring within or initiated by the hardware, such as an interrupt event or possibly a DMA event; or the annunciator may be placed into operation periodically by a timing mechanism to check for events. Thus, for example, in the case of a disk drive, the event annunciators may check records maintained by a disk drive of how frequently the drive is encountering certain types of errors, and may compare those records to limit values for error counts. Other event annunciators may check to see how rapidly software is operating, how many hardware errors are occurring during memory accesses, or they might check the basic configuration of the machine and its software both alone and also in comparison to other servers that are grouped together with this server to form a "cluster" so that they, the servers, may back each other up in case of a server failure.

When the event annunciator 112 discovers an event, it generates an announcement of the event, typically as an SNMP or TCP/IP message, that is routed to an event handler 114.

The event handler 114 is also customized to the monitored hardware or software 110, and follows up by investigating the event to see whether the event is one that may be ignored, whether it simply needs to be logged but does not require an immediate response, or whether the event should be reported as an incident that may need to be brought to the attention of service personnel. Both the event annunciator 112 and the event handler 114 are custom designed to match the server 102's hardware and operating system. The event handler 114 resides upon the server 102. But it can communicate with both the event annunciator and the monitored hardware or software over the network, it may reside on another machine, or even upon the SPOP node 108 that is described at a later point.

If the event handler 114 decides that an incident report needs to be generated, in this embodiment the event handler generates a command line call which it passes to the operating system shell to be executed by the operating system. It thereby places into operation an incident generator 116. The Incident generator 116 has a generalized interface that makes it able to accept such calls from any kind of event annunciator and handler monitoring any type of hardware or software. The interface is a general one. The incident generator 116 transforms the incoming information into a standardized form in accordance with the requirements of the incident escalator, which in this embodiment is implemented with the client portion of the Motive Chorus program. The incident generator transforms the event information into the precise form required by the incident escalator and again calls upon the operating system shell to execute the incident escalator, passing the necessary information to it to cause the creation of an incident report, just as if the information had come from a user through the user interface 120. As explained above, the incident escalator 118 combines this incident information with contact information 124 defining who should be contacted and also with general host information 122 defining the hardware and software configuration of the server 102, and it forwards all of this information on to a central support vendor response center 204 (FIG. 2) as a report of a service or maintenance incident.

In addition to responding to hardware and software events occurring in real time, the incident generator 116 may respond to the periodic execution of configuration scripts included among the prewritten diagnostic scripts 144 which are triggered periodically to survey the general configuration of the server 102, providing an archival time record of the server's configuration and how it has changed over time. This configuration data can be of great benefit to service personnel. The configuration data is essentially disguised to appear to be an "incident" for purposes of combining it with host and contact information 122 and 124 and delivering it to the central response center 204.

In another change from the way the Motive Communication's ServiceNet system normally functions, the contact information 124 is expanded to include a number of different contacts, such as different daytime and nighttime administrators, backup administrators, and the like to provide for a much more workable arrangement in the context of a large enterprise with many unsupervised servers, as opposed to personal computers. In addition, the host information 122 is augmented with information identifying the particular server from which the information is gathered. This information is incorporated into messages available to users at the client site 142 so that they may identify the server that gave rise to an incident.

Referring now to FIG. 3, the first server 102 is equipped with the HP-UX operating system of Hewlett Packard. It also contains an event annunciator 308 called EMS 308 (Hewlett Packard's EMS HA Monitor). EMS 308 is an event monitoring system and annunciator that can be programmed to trigger an event when a disk fails or when any other type of critical problem arises. EMS is able to generate messages using multiple protocols such as opcmsg, TCP/IP, and UDP. Thus, EMS operating on an HP-UX server such as 102 can function as the event annunciator 112 shown in FIG. 1. The HP-UX event handler 309 corresponds to the event handler 114 (FIG. 1) customized in accordance with the particularities of the HP-UX operating system running the server 102.

A second server 104 is equipped with, for example, the Windows 2000 operating system, and a third server 105 is equipped with the Linux operating system. These two servers, both of which are Hewlett Packard computers, can utilize the Hewlett Packard program TopTools (not shown) as an event annunciator.

In FIGS. 1, 2, and 3, all of the incident escalators and/or generators feed their incident messages into an SPOP (Support Point Of Presence) node (or server) 108 where the incident messages are preprocessed and then stored before being transmitted to the support vendor response center 204.

This has a number of advantages, but one of them in particular is illustrated in FIG. 3. A storage server 402 is shown which is not necessarily compatible with the Motive software. It includes storage devices 404 which need to be monitored. To accomplish that, a Hewlett Packard program called Command View Storage Device Manager (CVSDM) is installed on the storage server 402 to serve as an event annunciator 406, and a CVSDM-compatible storage handler 408 is installed upon the SPOP node 108. The CVSDM annunciator 406 and handler 408 thus can generate incidents that may be fed through a central event handler 150 and an incident escalator 150 (FIG. 1) directly into an incident receiver 130 all of which are installed right on the SPOP node 108. While normally that would cause the incidents to be merged with the incorrect host information and contact information (gathered from the SPOP node 108, rather than from the storage server 402), modifications in the way the Motive system operates cause the proper contact information and host information to be substituted for that normally gathered so that the incident properly identifies the storage server 402 as well as those who must be contacted when it is in need of service.

Referring once again to FIG. 1, the details of some of the software installed upon the SPOP node 108 are shown.

The SPOP node 108 contains an incident receiver 130, another software program provided by Motive Communications. The incident information coming in from the servers and, possibly, other devices must be parsed, and this is carried out by an incident parser 132. The particular messages within the incident reports are in accord with a program language design specification that is stored in and defined by an XML file called a parser definition 134. When the incident parser 132 starts up, it reads in the XML parser definition 134, and this configures the parser 132 to parse the particular types of messages which the incident escalators 118 are generating.

The parsed messages, including incident information, contact information, and host information, are stored in an incident database 136. This enables the user at the client site 142, by means of a web-based interface called a management console 140, also provided by Motive Communications (but heavily modified to serve the purposes of the present invention), to view and to modify the configuration data of the servers. The user 142 may also use a program called Motive Insight, utilizing prewritten diagnostic scripts 144, to browse though and to organize incident information. The user interface web pages that support the user interface 120 within the server 102 are also conveniently stored on the SPOP node 108 among the prewritten diagnostic scripts 144. Both the diagnostic scripts 144 and the user interface pages may be downloaded by service technicians and changed from time to time to keep the entire system current.

The web-based interface called management console 140 allows a user to adjust values 146, such as values defining the names, telephone numbers, and e-mail addresses of the multiple administrators and what servers they are to be the contact persons for in case of trouble, and other such things. The management console 140 is used to place the proper contact information into the files that the incident escalator 118 uses to populate incidents. The contact information 124 is contained in a flat file that may be defined and installed upon a computer at the time the computer is first set up with its software, and that can be easily modified later on.

As a result of all this, an administrator at an enterprise site can, without assistance from the vendor response center 204, set up accounts for inside users and view Motive Duet log files of incidents that have occurred and of how they have been handled. The administrator may adjust configuration values 146 and other perimeters of the Motive system.

FIG. 2 illustrates, at 204, the support vendor response center to which information defining incidents is sent by the send to adapter 138. This information crosses the Internet and fire walls and enters into a load balancer 206 which may be a router routing incoming messages relatively evenly to each of a number of content servers 208, 210, and 212. Content servers are servers typically located outside the main fire wall of the support vender where they may be accessed more readily by PCs and servers at customer sites, and in particular by the send to adapter 138 on the SPOP node 108 at client sites. The load balancer 206 is necessary because many messages defining incidents may be received at about the same time from many different enterprises, and also because the content servers are also used for many other client support purposes as well.

If the incoming message is an incident report, then the content server 208 sends it through the support vender's fire wall to a secondary load balancer 204 which routes it to an available analysis server, 220, one of several analysis servers 216, 218, and 220 that may be available at any given time to handle the load of incoming incident and configuration messages.

These messages first flow to an adapter 222 which responds to those parts of the incoming messages which have been customized beyond what is normally to be found in a Motive Communications incident message. Thus, for example, messages disguised as incidents but actually reporting the configuration of a server, such as those generated by configuration scripts, are intercepted and are routed to a configuration database 236 which thereby is able to maintain a historic record of a given computer's configuration. These may be further processed by an analyzer and report generator 238, or they may be accessed directly by a service engineer 230 upon demand. The configuration collectors 240, which may be installed upon the SPOP node 108 and which perform many routine monitoring tasks, may also provide data to the configuration database 236 (serving as a "tracker database") as is fully explained in application Ser. No. 09/851,963 filed May 10, 2001 (Van Giel et al.).

The remaining insight messages flow directly into Motive Communication's duet program 224 where they are organized and stored within an SQL database 228. The service engineer, at 230, then utilizes the Motive Insight program 226 to retrieve and to view these incident messages and to process the incidents appropriately. The service engineer 230 may place a phone call or send an e-mail message to the responsible contact person at the client site. In one embodiment of the invention, the service engineer 230 is also able to gain access to remote access server 232 and to routing and remote access server software 234 installed upon the SPOP node 108 using highly secure communication techniques to actually create direct access to the SPOP node computer 108, with the service engineer 230's display and keyboard functioning as if they were connected directly to the SPOP node 108, so that the service engineer may directly access the server 102 and other servers at the client enterprise site to exercise them, display their perimeters, and investigate any problem. This is described in the application Ser. No. 10/135,398 filed on May 1, 2002 (Soto, et al.). And as noted above, the configuration database 236 may also be a tracker database that works with Configuration collectors 240 installed at the client enterprise site to periodically monitor and record status information gathered from the servers at the client site, placing the recorded data into the database 236. This recorded data may then be analyzed by an analyzer and report generator 238 and transformed into reports which the service engineer 230 may call up and review at need. Accordingly, the service engineer 230 has at his or her fingertips much useful information to assist him or her in servicing the server 102, almost as if the service engineer 230 were present at the client site accessing the server 102 directly. And, with the aid of the historical configuration and recorded information contained within the tracker and configuration database 236, the service engineer 230 may be in a better position to perform diagnostic and repair tasks than he or she would be if actually present at the client site.

The invention claimed is:

1. An apparatus for delivering remote enterprise support comprising:
   a user interface that accepts information defining requests for assistance or reports of problems from users;
   an event handler that accepts information defining reports of events from annunciators and/or investigators associated with hardware and/or software;
   a source of configuration and contact information relating to unmanned computers or nodes as well as to manned computers;
   an incident management system communicatively connected to the user interface, the event handler, and the source of configuration and contact information, wherein the incident management system uniformly combines and conveys and manages all of this information, making it available to service personnel,
   wherein the source of configuration and contact information is obtained by scripts which are configured to run periodically on the unmanned computers, the manned computers and the nodes, irrespective as to whether or not any fault conditions are detected to exist on the unmanned computers, the manned computers, and the nodes;
   a plurality of content servers;
   a first load balancer that is communicatively connected to the plurality of content servers and that is communicatively connected to receive the uniformly combined and conveyed information output by the incident management system, as well as other uniformly combined and conveyed information output by other incident management systems, and that performs load balancing on all of the uniformly combined and conveyed information so as to not overload any of the plurality of content servers that perform further processing on that information;
   a second load balancer communicatively connected to receive data output by the plurality of content servers; and
   a plurality of analyst servers communicatively connected to the second load balancer,
   wherein the second load balancer performs load balancing on data output by the plurality of content servers and that only outputs incident report data of the data output by the plurality of content servers to the plurality of analyst servers, the plurality of analyst servers performing analysis on the data output by the plurality of content servers.

2. An apparatus in accordance with claim 1 which further comprises:
   a parser that parses the combined information to make it more readily manageable, the parser governed by a data structure definition that reflects the structure of all the varying types of information combined.

3. An apparatus in accordance with claim 1 which further comprises:
   wherein the scripts are configured to gather configuration data and to submit the configuration data as part of the uniformly combined and conveyed information to aid service personnel.

4. An apparatus in accordance with claim 3 wherein the incident management system further comprises:
   an adapter that channels the configuration data to a configuration database accessible to service personnel.

5. A method for delivering remote enterprise support comprising:
   accepting from users requests for assistance or reports of problems;
   accepting from annunciators and/or investigators associated with hardware and/or software information defining events;

gathering configuration and contact information relating to both unmanned and manned computers;

uniformly collecting, combining, conveying, and managing information resulting from the accepting steps, combining it with the gathered information, and making it available to service personnel, wherein the gathering step is obtained by scripts which are configured to run periodically on the unmanned computers or nodes, irrespective as to whether or not any fault conditions are detected to exist on the unmanned computers and the manned computers; and receiving the uniformly combined and conveyed information output by an incident management system, as well as other uniformly combined and conveyed information output by other incident management systems, and performing first load balancing on all of the uniformly combined and conveyed information so as to not overload any of a plurality of content servers that perform further processing on that information;

performing second load balancing on data output by the plurality of content servers; and outputting only incident report data of the data output by the plurality of content servers to a plurality of analyst servers, the plurality of analyst servers performing analysis on the data output by the plurality of content servers.

6. A method in accordance wit claim 5 further comprising:

parsing the combined information to make it more readily manageable, the parsing governed by a data structure definition that reflects the structure of all the varying types of information.

7. A method in accordance with claim 5 further comprising:

wherein the scripts periodically gather configuration data and submit it as part of the combined information to aid service personnel.

8. A method in accordance with claim 7 further comprising:

intercepting such configuration information and placing it into a configuration database accessible to service personnel.

9. An apparatus for delivering remote enterprise support comprising:

user interface means for accepting requests for assistance or reports of problems from users;

event handler means for accepting reports of events from annunciators and/or investigators associated with hardware and/or software;

means for providing configuration and contact information relating to unmanned computers or nodes as well as to manned computers;

incident management means for uniformly combining and conveying and managing all of this information, making it available to service personnel, wherein the means for providing configuration and contact information includes scripts which are configured to run periodically on the unmanned computers, the manned computers and the nodes, irrespective as to whether or not any fault conditions are detected to exist on the unmanned computers, the manned computers, and the nodes;

a plurality of content servers;

first load balancing means communicatively connected to receive the uniformly combined and conveyed information output by the apparatus, as well as other uniformly combined and conveyed information output by other apparatuses, and that performs load balancing on all of the uniformly combined and conveyed information so as to not overload any of the plurality of content servers that perform further processing on that information; and second load balancing means that performs load balancing on data output by the plurality of content servers and that only outputs incident report data of the data output by the plurality of content servers to a plurality of analyst servers, the plurality of analyst servers performing analysis on the data output by the plurality of content servers.

* * * * *